United States Patent [19]

Serizawa

[11] 3,934,839

[45] Jan. 27, 1976

[54] TAPE CASSETTE

[75] Inventor: Akio Serizawa, Tokyo, Japan

[73] Assignee: Sony Corporation, Tokyo, Japan

[22] Filed: June 7, 1974

[21] Appl. No.: 477,482

Related U.S. Application Data

[63] Continuation-in-part of Ser. No. 384,576, Aug. 1, 1973, abandoned.

[30] Foreign Application Priority Data

Aug. 11, 1972 Japan .......................... 47-94388[U]

[52] U.S. Cl. .................................. 242/198; 360/93

[51] Int. Cl.[2] .................... G03B 1/04; G11B 15/32; G11B 23/04

[58] Field of Search ............................ 242/197–200, 242/68.3, 68.1, 71.1, 71.2; 360/93–96

[56] References Cited

UNITED STATES PATENTS

| | | | |
|---|---|---|---|
| 2,941,741 | 6/1960 | Bilsback | 242/198 |
| 3,104,842 | 9/1963 | Loewe | 242/68.3 |
| 3,408,017 | 10/1968 | Hashimoto | 242/200 |

*Primary Examiner*—Leonard D. Christian

*Attorney, Agent, or Firm*—Lewis H. Eslinger; Alvin Sinderbrand

[57] ABSTRACT

In a tape cassette for use with a tape recording and/or reproducing apparatus having a rotatable reel drive device and which includes a cassette casing containing at least one rotatable tape-carrying reel provided with a hollow hub defining a socket having an opening at one end of the hub for receiving the reel drive device when the latter is inserted through an aperture in the casing registered with the socket; the socket is given a stepped configuration to have a reduced-diameter portion at the end remote from the socket opening and at least one axially elongated rib projects radially inward from the surface of the socket at a relatively larger-diameter portion of the socket, and the rotatable reel drive device is provided with an end portion closely engageable in the reduced-diameter portion of the socket for accurately locating the reel in respect to the axis of rotation of the reel drive device and with at least one projection extending radially beyond and spaced axially from such end portion of the reel drive device for reception in the relatively larger-diameter portion of the socket and driving engagement with the rib therein.

13 Claims, 7 Drawing Figures

42a
33
13
42
30'
28
28'
32
1f
α
30
29
1a
1
1b
9
10
21
23b
14
19
31
41
11
15
12
38
8
12a
7
1e 40a
47a
47b
17
40
45c'
23a
45b
47c
16
48
44
37
48a
45c
39
45
46
45a
49
2
47d
45e
46c
46a
46b
49'
47
48'

42
α
33
42a
30
30'
31
28
28'
32
1f
1a
1
1b
9
10
13
21
47a
45c'
23b
12
14
38
8
48
37
44
45a
48a
45c
47d
19
47b
47c
29
41
17
40a
40
23a
16
15
11
7
49
12a
39
2
45b
45e
46c
45
46a
49'
48'
46b
47
1e

TAPE CASSETTE

CROSS-REFERENCE TO RELATED APPLICATION

This application is a continuation-in-part of U.S. patent application Ser. No. 384,576, filed Aug. 1, 1973 now abandoned.

BACKGROUND OF THE INVENTION

1. Field of the Invention

This invention relates generally to tape recording and/or reproducing apparatus employing tape cassettes, and more particularly is directed to improved arrangements by which each tape-carrying reel contained in a cassette is engaged with an associated tape drive device of the recording and/or reproducing apparatus.

2. Description of the Prior Art

It has been proposed, for example, in U.S. Pat. No. 3,111,281, to provide a tape recording and/or reproducing apparatus employing tape cassettes in which each tape-carrying reel contained within the cassette housing or casing is engageable by an associated tape drive device of the apparatus which extends through an aperture of the cassette housing when the cassette is positioned on the apparatus. However, in such existing arrangements, difficulties are encountered in obtaining smooth rotation of the reel or reels within the cassette housing during transport of the tape. More specifically, when the tape is being transported, the rotated reel frequently vibrates relative to the associated reel drive device. Such vibration, which may involve a rotational, radial or tilting movement of the reel relative to the reel drive device, is transmitted to the tape being wound on, or unwound from the reel and produces an undesirable modulation or distortion of the signal being recorded or reproduced on the transported tape by a magnetic head contacting the latter. The vibration is particularly noticeable when play exists between the reel and the associated reel drive device in their mutually engaged condition. In existing arrangements, the portions of the reel and reel drive device which constitute a rotatable coupling therebetween are also employed for positioning the reel with respect to the reel drive device, and it has been necessary to provide a substantial play therebetween in order to facilitate the installation and removal of the cassette in respect to the recording and/or reproducing apparatus. Thus, it has been considered impossible, as a practical matter, to avoid the undesirable viabration of the reel or reels in a cassette type apparatus.

SUMMARY OF THE INVENTION

Accordingly, it is an object of this invention to provide a tape cassette that avoids the above described problem when used in a tape recording and/or reproducing apparatus.

Another object is to provide a tape cassette in which each tape-carrying reel therein is rotated in a smooth or stable manner during the winding or unwinding of tape thereon.

A further object is to provide a tape cassete, as aforesaid, for use with a tape recording and/or reproducing apparatus, and in which each tape-carrying reel and the associated reel drive device having separate, mutually engageable portions for positioning the reel in respect to the reel drive device and for rotatably coupling together the reel and reel drive device, respectively.

Still another object is to provide a tape cassette for use with a tape recording and/or reproducing apparatus, as aforesaid, and in which each tape-carrying reel and the associated reel drive device have separate, mutually engageable portions for centering the reel relative to the reel drive device, for axially locating the reel relative to the reel drive device, and for rotatably coupling the reel with the reel device, respectively.

In accordance with an aspect of this invention, each tape-carrying reel contained in the casing of a cassette includes a hollow hub defining a socket having an opening at one end in registration with an aperture of the cassette casing, the socket is of stepped configuration to have a reduced-diameter portion at the end thereof remote from its opening, at least one axially elongated rib projects radially inward from the surface of the socket at a relatively larger-diameter portion of the socket, and the associated reel drive device is insertable into the casing through the aperture in the latter and includes an end portion closely engageable in the reduced-diameter portion of the socket for accurately locating the reel in respect to the axis of rotation of the reel drive device and at least one projection extending radially beyond and spaced axially from the end portion of the reel drive device for reception in the relatively larger-diameter portion of the socket and driving engagement with the rib therein.

The above, and other objects, features and advantages of the invention, will be apparent in the following detailed description of illustrative embodiments thereof which is to be read in connection with the accompanying drawings.

DESCRIPTION OF THE PREFERRED EMBODIMENTS

Figure 1:
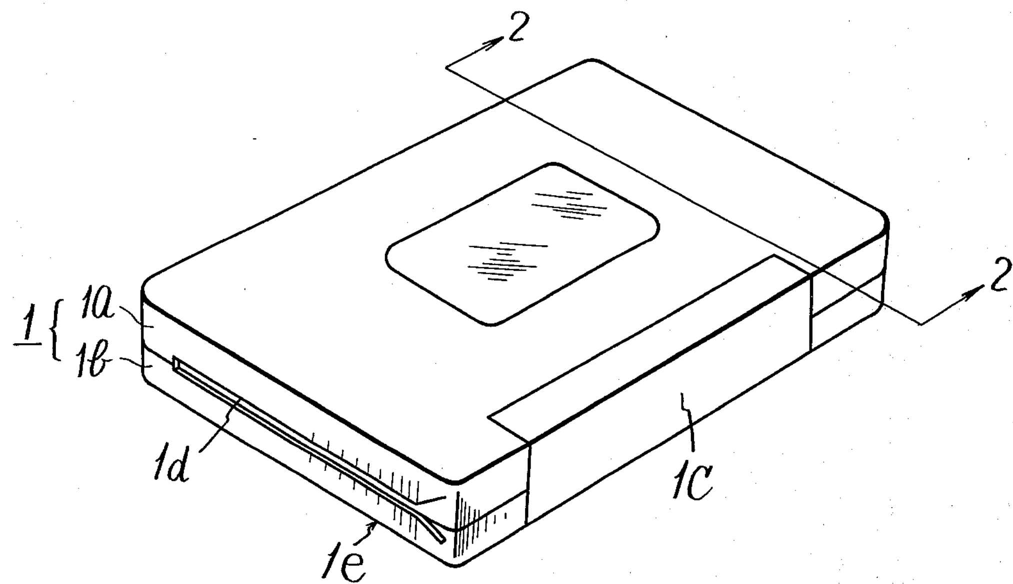
FIG. 1 is a perspective view showing a tape cassette of a type in which this invention may be embodied.
Figure 2:
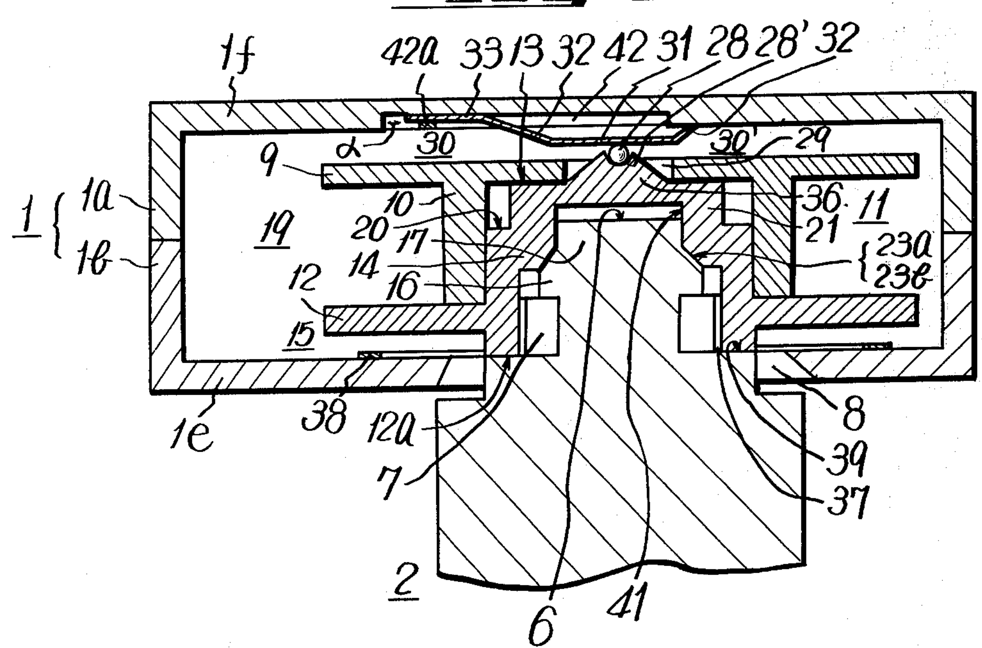
FIG. 2 is an enlarged sectional view taken along the line 2—2 on FIG. 1, and showing a tape reel within the cassette engaged with the associated reel drive device of a tape recording and/or reproducing apparatus in accordance with one embodiment of this invention.

Referring to the drawings in detail, and initially to FIGS. 1 and 2 thereof, it will be seen that the invention may be embodied in a tape cassette of a type, for example, which is intended for use in connection with a video tape recorder (VTR). The casing 1 of the cassette is shown to comprise upper and lower sections **1*a* and 1*b* of generally rectangular configuration having peripheral flanges which are suitably joined to each other to constitute a side or peripheral wall of casing 1 extending between a bottom wall 1*e* and a top wall 1*f*. The case 1** is provided with an opening extending along one of its relatively long sides and being normally closed by a pivoted lid or cover 1*c*. When lid 1*c* is open, a magnetic tape (not shown) which is wound on, and extends between supply and takeup reels within casing 1 is exposed at the opening of the casing so as to permit the recording and reproduction of signals on such tape. The relatively short sides of the peripheral wall of casing 1 may have grooves 1*d* therein which are engageable by suitable guiding members (not shown) provided on the cassette holder of a VTR for guiding the cassette casing to a predetermined position on the VTR or tape recording and/or reproducing apparatus. When the tape cassette is moved to such predetermined or operative position, it is intended that each of the tape carrying reels within casing 1, for example, the reel generally indicated at 19 on FIG. 2, will be engaged by an associated reel drive device 2 of the VTR which projects into cassette casing 1 through a respective aperture 8 provided in its bottom wall 1*e*.

In the embodiment of the present invention shown on FIG. 2, each tape-carrying reel 19 is formed of two parts 11 and 15. The reel part 11 consists of an upper circular flange 9 having a hollow, cylindrical hub portion 10 depending concentrically therefrom to define the outer surface of a reel hub. The other reel part 15 is shown to consist of a lower circular flange 12 and an inner hollow cylindrical hub portion 14 which is concentric with flange 12 and extends both above and below the latter. The outer surface of hub portion 14 is dimensioned to fit closely within outer hub portion 10, and reel part 15 further includes a relatively reduced-diameter, hollow cylindrical portion 21 which extends upwardly from hub portion 14 with an outer annular shoulder 20 being defined therebetween and with the upper end of portion 21 being closed by an end wall 13 engageable against flange 9 within outer hub portion 10. The wall thickness of cylindrical portion 21 may be approximately the same as that of the inner hub portion 14 so that portions 14 and 21 of reel part 15 define a downwardly opening socket of stepped configuration having a reduced-diameter portion 41 at the end of the socket remote from the opening of the latter and relatively larger-diameter portion at the open end of the socket, that is, spaced axially from reduced-diameter socket portion 41. Preferably, a frusto-conical or tapering surface 23*b* is provided within cylindrical portion 21, at the bottom of the latter, that is, between the reduced-diameter socket portion 41 and the relatively larger-diameter socket portion defined within inner hub portion 14. One or more axially elongated ribs 7 project radially inward from the surface of such relatively larger-diameter socket portion and, in the case where a plurality of such ribs 7 are provided, the same are circumferentially spaced apart within inner hub portion 14. The radially inward projection of each rib 7 is selected so that the radial distance from the center of reel 9 to the inner surface of each rib 7 will be greater than the radius of the reduced-diameter socket portion 41.

The end wall 13 of reel part 15 may have a central domed portion 36 which projects upwardly within a central opening 29 in upper reel flange 9 and which is formed with a central depression 28'. Reel parts 11 and 15 are assembled together, as shown on FIG. 2, and are held in such assembled condition either by the tight or frictional engagement of inner hub portion 14 within outer hub portion 10 or preferably by an adhesive or cement therebetween. It will be apparent that, when reel parts 11 and 15 are thus assembled, a magnetic tape (not shown) can be wound on the surface of outer hub portion 10 between reel flanges 9 and 12.

Each tape carrying reel 19 rotatable within cassette casing 1 is urged downwardly towards bottom wall 1*e* so that the lower end of inner hub portion 14 below flange 12 extends into the respective aperture 8 in the bottom wall of cassette casing 1. Such downward urging of each reel 19 is effected by means 30 that includes a spring member 30' and grooves 42 formed in the underside of upper casing wall 1*f* for locating spring member 30'. The spring member 30' is shown to consist of a central disk 31 having a plurality of resilient legs 32 radiating from disk 31 and inclined upwardly from the latter to end portions 33 which are radially slidable in the respective radial grooves 42. In the illustrated embodiment, spring member 30' is provided with three resilient legs 32 that are equally spaced apart thereabout, and the respective grooves 42 are shown to be dimensioned so that a substantial clearance $\alpha$ exists between the outer ends of each groove and the respective end portion 33 of the leg 32. Thus, when disk 31 is urged upwardly toward top casing wall 1*f* against the force of resilient legs 32, the end portion 33 of such legs can slide radially outward within the respective grooves 42. Further, each groove 42 has projections 42*a* formed therein below the respective leg end portion 33 to retain the latter within the groove. A ball bearing 28 is seated in depression 28' of each reel 19 and is acted upon by the disk 31 of the respective spring member 30' so that the latter can urge reel 19 downwardly without substantial frictional resistance to rotation of the reel by reason of spring member 30'.

A ring 38 of a frictional material, such as, rubber or the like, is adhesively secured on the upper surface of bottom wall 1*e* of the cassette casing under flange 12 of each reel 19 so that, when reel 19 is pressed downwardly against bottom wall 1*e* by the respective spring member 30', for example, when cassette 1 is not in use, the ring 38 of frictional material is engaged by the flange 12 to frictionally resist undesired rotation of the reel.

The reel drive device 2 associated with each reel 19 in cassette casing 1 is shown to include a cylindrical end portion 17 which is closely engageable within the reduced-diameter socket portion 41 and which is joined, by a frusto-conical or tapered portion 23*a* having the same slope as the frusto-conical surface portion 23*b* of the socket, with a larger-diameter cylindrical portion 16 dimensioned to extend loosely past the inner surfaces of ribs 7. Located below cylindrical portion 16 and held in position by the latter is a reel drive member diametrically dimensioned to be received in the relatively larger-diameter portion of the socket of reel 19 and having at least one radially directed projection 37 which is engageable with or between the rib or ribs 7, respectively, of reel 19 for rotatably coupling the latter with reel drive device 2. The reel drive device 2 is further shown to have an annular reference surface 39 extending radially beyond the projection or projections 37 and facing axially in the direction of insertion of reel drive device 2 into aperture 8 of casing 1. Reference surface 39 has an outer diameter smaller than the diameter of aperture 8 and is engageable with a reference surface 12*a* formed on the end of inner hub portion of reel 19 around the opening of the socket formed in the latter. Thus, it will be seen that the relatively larger-diameter socket portion of reel 19 in which the ribs 7 are provided is disposed axially between the reference surface 12*a* on the hub of reel 19 and the reduced-diameter socket portion 41 of the reel.

It will be apparent that, when tape cassette 1 is positioned on a tape recording and/or reproducing apparatus or VTR having a reel drive device 2 for each reel 19 within the cassette casing, each reel drive device 2 extends into the respective aperture 8 of the cassette casing and has its end portion 17 guided into the reduced-diameter socket portion 41 by the tapered surface 23*b* of the socket. When end portion 17 of the reel drive device is fully and closely engaged within socket portion 41, as shown on FIG. 2, the tapering or frustoconical surface portions 23*a* and 23*b* of the reel drive device and socket, respectively, are also mutually engaged. The close engagement of end portion 17 of the reel drive device in socket portion 41 and the mutual engagement of frustoconical surface portions 23*a* and 23*b* are effective to accurately and securely center reel 19 in respect to reel drive device 2 so that the reel 19 will not vibrate in respect to reel drive device 2 when the latter is rotatably driven through a conventional drive mechanism (not shown). When surfaces 17 and 41 and surfaces 23*a* and 23*b* are mutually engaged, the upper end 6 of the reel drive device 2 extends above the plane of the median of tape (not shown) wound on the respective reel 19 so that the areas of close contact of surfaces 17 and 23*a* with surfaces 41 and 23*b*, respectively, extend from above that plane to below that plane for securely resisting tilting of the reel relative to its reel drive device. Further, when reel 19 is thus accurately centered in respect to reel drive device 2, the projection or projections 37 of the latter are engaged with or between the ribs 7 within the larger-diameter portion of the socket so as to rotatably couple reel 19 with reel drive device 2. It will also be apparent that, upon full insertion of reel drive device 2 into the socket or reel 19, as described above, reference surface 39 and reel drive device 2 engages the confronting reference surface 12*a* on reel 19 to lift flange 12 of the latter away from ring 38 of frictional material whereby to free the reel for rotation, and further to accurately locate the reel in the axial direction. Since ribs 7 and projection or projections 37 of reel 19 and reel drive device 2, respectively, for obtaining the rotatable coupling therebetween are apart from the described engageable surfaces by which the reel is centered and axially located in respect to the reel drive device, such surfaces can be formed so as to have very little play or clearance therebetween and the play or clearance is not enlarged by repeated engagement and disengagement of the rotatable coupling elements.

Referring now to FIGS. 3A and 3B and FIGS. 4A–4C, it will be seen that, in another preferred embodiment of this invention, as there illustrated, the parts or elements corresponding to those described above with reference to FIGS. 1 and 2 are indicated by the same reference numerals and will be described in detail only insofar as such parts are different from the corresponding parts of the first described embodiment. As shown particularly on FIGS. 3A, 3B and 4B, the reel drive device 2 of this embodiment generally comprises a reel positioning member 40 having the relatively small-diameter end portion 17, the frusto-conical surface portion 23*a* and the relatively larger-diameter cylindrical surface portion 16 formed thereon, a reel driving member 44 on which the projection 37 is formed, and a cup-shaped reel locating member 45 which defines the reference surface 39, as hereinafter described in detail. The cup-shaped reel locating member 45 is shown to open upwardly and to have a cylindrical outer wall or drum 45*a* which defines the reference surface 39 at its upper end edge, and a tubular central extension 45*b* which projects axially above reference surface 39 and which has a non-circular outer surface, for example, a hexagonal outer surface as particularly shown on FIG. 3B. A metal bearing sleeve 45*c* is fixed within tubular extension 45*b*, for example, by having an outer diameter slightly larger than the inner diameter of tubular extension 45*b* so as to have a press-fit therein, and bearing sleeve 45*c* is axially dimensioned so that its upper end portion 45*c'* projects above the upper end of tubular extension 45*b*, as particularly shown on FIG. 4B.

The reel driving member 44 is shown to include a ring 48 having a non-circular opening 48*a* (FIG. 3B) for example, a hexagonal opening, as shown, corresponding to the cross-section of the outer surface of tubular extension 45*b* so that ring 48 is axially slidable on such extension 45*b*. Formed integrally with ring 48, and extending radially therefrom, is the projection 37, as shown, or a plurality of such projections. The radial extent of projection 37 from the center of ring 48 is selected so that, when ring 48 is slidable on tubular extension 45*b* of reel locating member 45, projection 37 can move downwardly within cylindrical outer wall or drum 45*a*. A helical compression spring 49 extends around tubular extension 45*b* and has its lower end seated in a groove 45*e* formed in the bottom of cup-shaped locating member 45 (FIG. 4B), and the upper end of spring 49 bears against the underside of ring 48 on tubular extension 45*b* for urging reel driving member 44 upwardly to the position shown on FIGS. 3A, 4B and 4C.

Reel positioning member 40 is shown to have an axial bore 40*a* formed with its diameter slightly smaller than the outer diameter of bearing sleeve 45*c* so as to be secured to bearing sleeve 45*c* by the resulting press-fit when reel positioning member 40 is urged onto the upper end portion 45*c'* of the bearing sleeve. It will be apparent that, when reel positioning member 40 is thus assembled on bearing sleeve 45*c*, the underside of the relatively larger-diameter cylindrical portion 16 of the reel positioning member acts as a stop for limiting the upward movement of reel driving member 44 by spring member 49.

Each reel drive device 2 comprised of the members 40, 44 and 45 assembled together, as aforesaid, is rotatable on a shaft 46 that is loosely received by bearing sleeve 45*c* and extends upwardly from a chassis or support plate 47 to which the lower end of the shaft is secured, as by a nut 48' and a washer 49'. Bearing sleeve 45*c* is held at a suitable height on vertical shaft 46 by means of a thrust ring or washer 46*c* which rests on a split washer or so-called Circlip 46*b* resiliently engaged in an annular groove 46*a* in the lower portion of shaft 46. In order to prevent upward removal of reel drive device 2 from shaft 46, a screw 47*a* extends into a tapped bore 47*c* in the upper end of shaft 46 and secures a washer 47*b* on the latter, with the periphery of such washer 47*b* projecting radially beyond shaft 46 (FIGS. 4B and 4C) to limit upward movement of bearing sleeve 45*c*. Locating posts 47*d d* (FIGS. 4B and 4C) may extend upwardly from chassis or base plate 47 so as to be engageable, at their upper ends, by the bottom wall 1*e* of cassette casing 1 for determining the operative position of the cassette on the VTR or tape recording and/or reproducing apparatus.

Figure 3B:
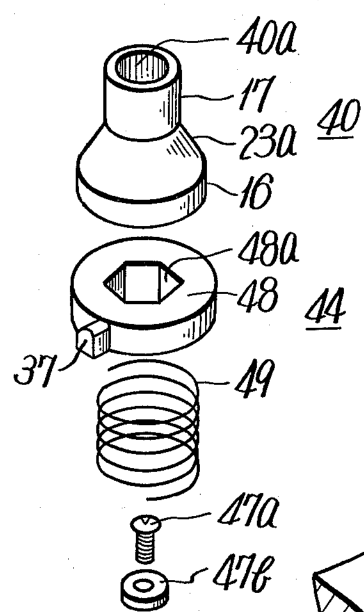
FIG. 3B is an exploded perspective view of the several components or parts of the reel drive device shown in FIG. 3A.
Figure 3A:
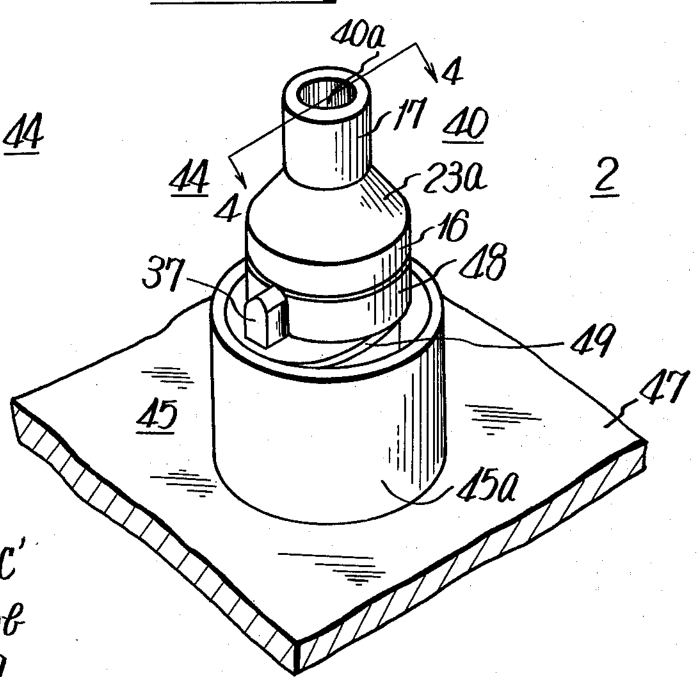
FIG. 3A is a perspective view of a reel drive device in accordance with another embodiment of this invention.
Figure 3A:
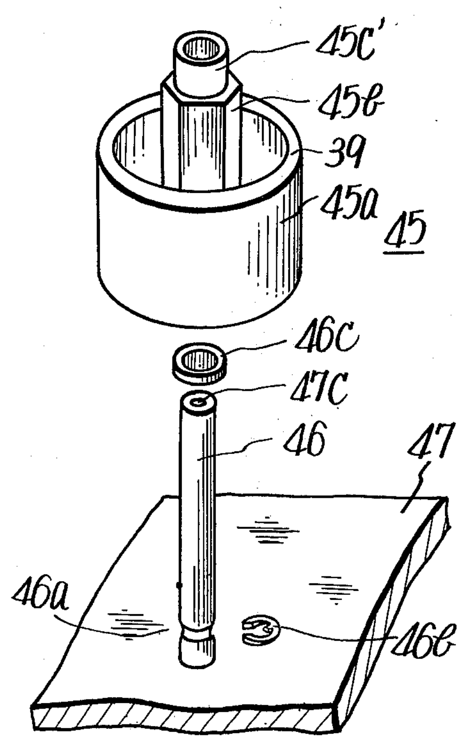

Each reel 19 in the cassette casing 1 intended for use in connection with the real drive device 2 in accordance with the second described embodiment of this invention is shown (FIG. 4A) to be generally similar to the reel 19 described above in connection with FIG. 2 and preferably has its ribs 7 formed with rounded lower ends, while each projection 37 of the reel driving member 44 is similarly preferably formed with a rounded upper surface, as particularly shown on FIGS. 3A and 3B.

It will be apparent that the members 40, 44 and 45 of reel drive device 2 are each shaped to avoid the presence of a necked or relatively narrow portion interposed between relatively wide portions so that such members can be conveniently molded of suitable plastic resins by means of relatively simple dies. Further, the members 40, 44 and 45 can be simply assembled together, as previously described, so that mass production of the drive device 2 can be efficiently realized. Of course, the dimensions of reel positioning member 40, reel driving member 44 and reel locating member 45 are selected in accordance with the corresponding dimensions of the respective reel 19 in cassette casing 1.

Figure 4:
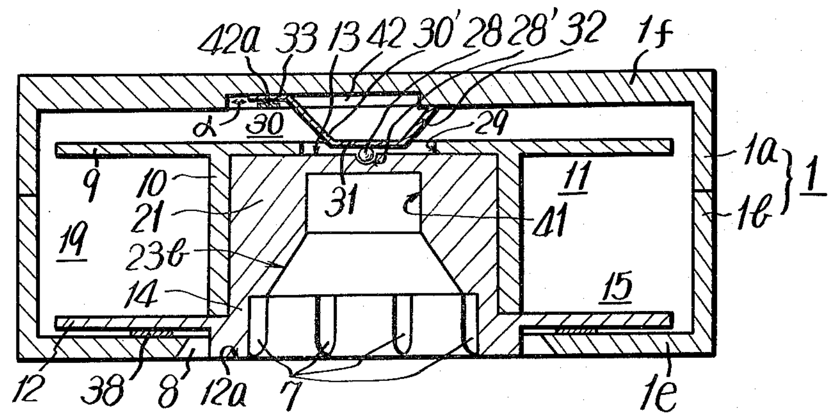
FIG. 4A is a sectional view of a tape cassette similar to that shown on FIG. 2, but constructed in accordance with another embodiment of this invention.
FIG. 4B is a sectional view of the reel drive device of FIG. 3A taken along the line 4—4 on the latter.
FIG. 4C is a sectional view showing the cassette of FIG. 4A engaged with the reel drive device of FIG. 4B.
Figure 4:
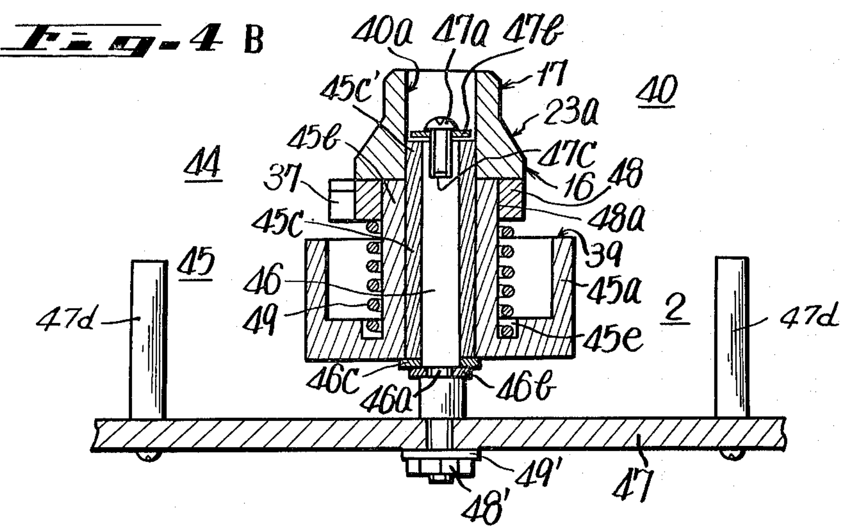
Figure 4:
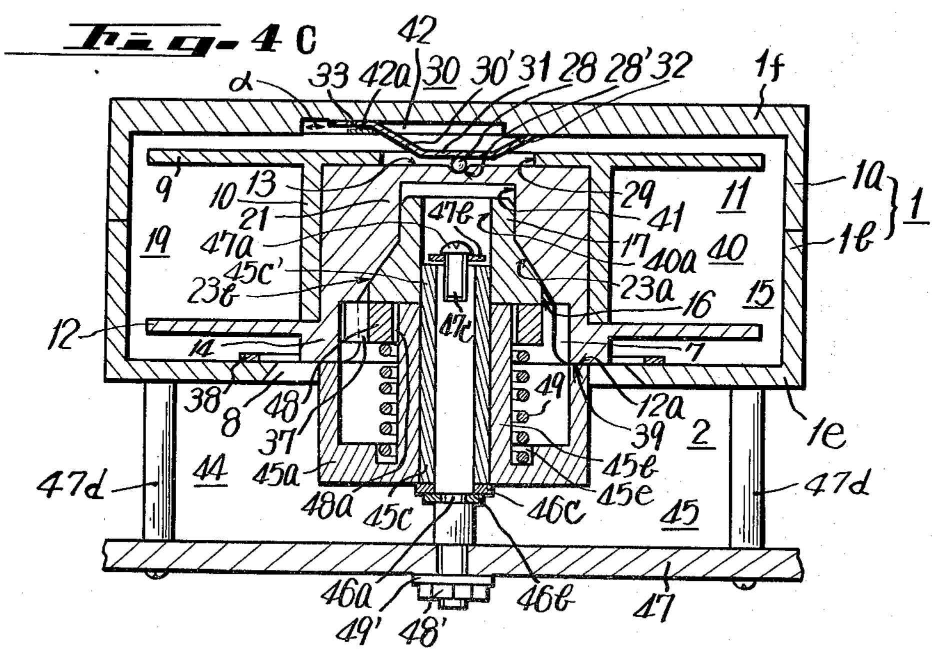

When the cassette of FIG. 4A is moved downwardly onto locating posts 47*d* so as to engage each of its reels 19 with the respective reel drive device 2, the reduced-diameter end portion 17 of reel positioning member 40 is guided smoothly into the reduced-diameter socket portion 41 by the adjacent frustro-conical surface portion 23*b* in the socket. Eventually, as shown on FIG. 4C, the surface portions 17 and 23*a* of reel positioning member 40 closely engage the respective surface portions 41 and 23*b* of the reel socket for accurately centering reel 19 in respect to the axis of rotation of reel drive device 2. If, during such engagement of reel positioning member 40 within the socket of reel 19, the projection or projections 37 on reel driving member 44 do not fit between ribs 7 within the relatively larger-diameter portion of the socket, that is, if the lower end of a rib 7 engages the upper end or surface of a projection 37, then ring 48 of reel driving member 44 is moved downwardly along tubular extension 45*b* against the force of spring 49 so as to avoid interference with the insertion of reel positioning member 40 into the reel socket. By reason of the previously mentioned rounded configurations of the lower ends of ribs 7 and the upper surface of each projection 37, during such downward movement or deflection of ring 48, either the reel 19 or the reel drive device 2 is urged to turn a small angular distance so that spring 49 can urge ring 48 upwardly to its normal position in which projection 37 engages between adjacent ribs 7 for rotatably coupling reel 19 to the reel drive device. Further, as surfaces 17 and 23*a* on reel positioning member 40 engage the corresponding surfaces 41 and 23*b* within the reel socket, the reference surface 39 on reel locating member 45 engages the reference surface 12*a* on reel 19 to lift the latter against the force of spring member 30' for accurately locating the reel in the axial direction and for releasing the reel from the braking action of the ring 38 of frictional material. Thereafter, the rotation of each reel 19 may be controlled through the reel drive device 2 engaged therewith and which may be driven, for example, through an idler wheel (not shown) engaged with the outer wall or drum 45*a* of reel locating member 45.

As before, when the cassette of FIG. 4A is loaded on, or engaged with the reel drive devices of FIG. 4B, the upper end of the cylindrical surface portion 17 of each reel drive device 2 extends above the plane of the median of tape wound on the respective reel 19 so that the area of close contact of surface portions 17 and 23*a* on reel drive device 2 with surface portions 41 and 23*b* in the respective reel socket extends from above that plane to below that plane for securely resisting tilting of the reel.

When the cassette is to be removed from the VTR or recording and/or reproducing apparatus, the cassette casing 1 is simply lifted relative to the reel drive device or devices 2 to withdraw the latter from the respective reel socket or sockets, whereupon, the spring member 30' associated with each reel 19 urges the latter against bottom cassette wall 1*e* where ring 38 of frictional material engages reel flange 12 to prevent unwanted rotation of the reel.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tape cassette for use with a tape recording and/or reproducing apparatus having a rotatable reel drive means, said cassette comprising a casing including opposed walls and at least one tape-carrying reel rotatably contained in said casing between said walls, said casing having an aperture in one of said walls adapted for the insertion of the reel drive means therein, said reel including a hollow hub defining a socket having an opening at one end of said hub in registration with said aperture for the entry into said socket of the reel drive means inserted through said aperture, said socket being of stepped configuration to have a relatively large-diameter portion extending from said opening of the socket and a reduced-diameter cylindrical portion at the end of the socket remote from said opening for closely receiving a correspondingly dimensioned end portion of the reel drive means with a frusto-conical surface portion leading from said large-diameter portion to said reduced-diameter portion for directing the end portion of the reel drive means into said reduced-diameter portion of the socket, and at least one axially elongated rib projecting radially inward from the surface of said socket at said large-diameter portion of the latter and by which said reel is adapted to be rotatably coupled with the reel drive means.

2. A tape cassette according to claim 1; in which said reel has a reference surface on said hub engageable with a corresponding reference surface on the reel drive means when the latter enters said socket for axially positioning said reel.

3. A tape cassette according to claim 2; in which said reference surface on the hub extends around said opening of the socket at said one end of the hub, so that said rib is disposed axially between said reference surface on the hub and said reduced-diameter portion of the socket.

4. A tape cassette according to claim 1; in which said reel has at least of flange extending radially outward from said hub adjacent said one end, said casing has friction material on the inner surface of said one wall engageable by said flange for resisting rotation of the reel when the latter is urged axially in the direction against said one wall, resilient means within said casing act axially on said reel in said direction, and said reel has a reference surface on said hub facing axially in said direction and being engageable by a corresponding, oppositely facing reference surface on the reel drive means when the latter enters said socket for displacing said reel axially away from said one wall and thereby spacing said flange from said friction material.

5. The combination of a tape cassette comprising a casing including opposed walls one of which has an aperture therein and at least one tape-carrying reel rotatably contained in said casing adjacent said aperture, said reel including a hollow hub defining a socket having an opening at one end of said hub in registration with said aperture, said socket being of stepped configuration to have a reduced-diameter cylindrical portion at the end thereof remote from said opening, at least one axially elongated rib projecting radially inward from the surface of said socket at a relatively larger-diameter portion of the socket spaced from said reduced-diameter portion, and a frusto-conical surface portion leading from said larger-diameter portion to said reduced-diameter portion; and rotatable reel drive means insertable into said casing through said aperture and including a cylindrical end portion guided by said frusto-conical surface portion into said reduced-diameter portion of the socket and being closely engageable in said cylindrical reduced-diameter portion for accurately locating said reel in respect to the axis of rotation of said reel drive means, and at least one projection extending radially beyond and being spaced axially from said end portion of the reel drive means for reception in said relatively larger-diameter portion of the socket and driving engagement with said rib therein.

6. The combination according to claim 5; in which said reel has a reference surface on said hub facing axially in the direction in which said socket opens, and said reel drive means has a reference surface facing axially in the opposite direction and being engageable with said reference surface on said hub for axially locating said reel in respect to said reel drive means.

7. The combination according to claim 6; in which said reference surface on the hub extends around said opening of the socket at said one end of the hub, and said relatively larger-diameter portion of the socket and said rib therein are disposed between said reference surface on the hub and said reduced-diameter portion of the socket.

8. The combination according to claim 6; in which said reel has at least one flange extending radially outward from said hub adjacent said one end of the latter, said casing has friction material on the inner surface of said wall engageable by said flange for resisting rotation of the reel, resilient means within said casing urges said reel axially in said direction in which the socket opens for engaging said flange with said friction material, and said reference surfaces on the hub and reel drive means, respectively, are axially located to displace the reel away from said one wall of the casing when said end portion of the reel drive means is engaged in said reduced-diameter portion of the socket.

9. The combination of a tape cassette comprising a casing including opposed walls one of which has an aperture therein and at least one tape-carrying reel rotatably contained in said casing adjacent said aperture, said reel including a hollow hub defining a socket having an opening at one end of said hub in registration with said aperture, said socket being of stepped configuration to have a reduced-diameter portion at the end thereof remote from said opening, at least one axially elongated rib projecting radially inward from the surface of said socket at a relatively larger-diameter portion of the socket spaced from said reduced-diameter portion, and a frusto-conical portion leading from said larger-diameter portion to said reduced-diameter portion; and rotatable reel drive means insertable into said casing through said aperture and including an end portion guided by said frusto-conical portion into said reduced-diameter portion of the socket and being closely engageable in said reduced-diameter portion for accurately locating said reel in respect to the axis of rotation of said reel drive means, and at least one projection extending radially beyond and being spaced axially from said end portion of the reel drive means for reception in said relatively larger-diameter portion of the socket and driving engagement with said rib therein, and in which said reel drive means has a frusto-conical portion leading to said end portion of the reel drive means and engageable in said frusto-conical portion of the socket.

10. The combination of a tape cassette comprising a casing including opposed walls one of which has an aperture therein and at least one tape-carrying reel rotatably contained in said casing adjacent said aperture, said reel including a hollow hub defining a socket having an opening at one end of said hub in registration with said aperture, said socket being of stepped configuration to have a reduced-diameter portion at the end thereof remote from said opening, and at least one axially elongated rib projecting radially inward from the surface of said socket at a relatively larger-diameter portion of the socket spaced from said reduced-diameter portion; and rotatable reel drive means insertable into said casing through said aperture and including a rotatable reel-positioning member having an end portion thereon closely engageable in said reduced-diameter portion of the socket for accurately locating said reel in respect to the axis of rotation of said reel drive means, a reel drive member having at least one projection thereon extending radially beyond and being spaced axially from said end portion of the reel-positioning member for reception in said relatively larger-diameter portion of the socket and driving engagement with said rib therein, said reel driving member being rotatably coupled with said reel-positioning member and axially movable relative to the latter, and spring means urging said reel drive member axially in the direction toward said reel positioning member so that, in the event of interference between said rib and said projection when said end portion of the reel drive means is inserted in said reduced-diameter portion of the socket, said reel drive member is displaced axially against said spring means until relative rotation of the reel drive means and reel removes said interference.

11. The combination according to claim 10; in which said reel has a reference surface on said one end of the hub extending around said opening of the socket and facing axially in the direction in which the socket opens; and in which said reel drive means further has a cup-shaped reel locating member fixed relative to said reel positioning member and into which said reel drive member is axially displaceable against said spring means, said cup-shaped reel locating member defining a reference surface at its edge which faces axially in the direction opposite to the opening of said socket and is engageable with said reference surface on the reel hub for axially locating said reel in respect to said drive means.

12. The combination according to claim 11; in which said reel has at least one flange extending radially outward from said hub adjacent said one end of the latter, said casing has friction material on the inner surface of said one wall engageable by said flange for resisting rotation of the reel, resilient means within said casing urges said reel axially in said direction in which the socket opens for engaging said flange with said friction material, and said reference surfaces on the hub and reel drive means, respectively, are axially located to displace the reel away from said one wall of the casing when said end portion of the reel drive means is engaged in said reduced-diameter portion of the socket.

13. The combination according to claim 11; in which said cup-shaped reel locating member has a tubular central extension with a non-circular outer surface, said reel drive member has a non-circular aperture slidable axially on said non-circular tubular extension so as to be rotatably coupled with said cup-shaped locating member, and said spring means is constituted by a helical compression spring extending around said tubular extension and bearing at its opposite ends against said reel drive member and said reel locating member, respectively.

* * * * *